United States Patent [19]
Henry et al.

[11] Patent Number: 5,629,999
[45] Date of Patent: May 13, 1997

[54] SIDE-GAP MODE TAPERING FOR INTEGRATED OPTIC WAVEGUIDES

[75] Inventors: Charles H. Henry, Skillman; Edward J. Laskowski; Yuan P. Li, both of Scotch Plains; Weyl-kuo Wang, Westfield, all of N.J.

[73] Assignee: Lucent Technologies Inc., Murray Hill, N.J.

[21] Appl. No.: 401,545

[22] Filed: Mar. 10, 1995

[51] Int. Cl.⁶ .................................................. G02B 6/26
[52] U.S. Cl. ................................. 385/43; 385/39; 385/27
[58] Field of Search .................................. 385/43, 27, 28, 385/29, 39, 129, 130

[56] References Cited

U.S. PATENT DOCUMENTS

| | | | |
|---|---|---|---|
| 3,779,628 | 12/1973 | Kapron et al. | 385/43 |
| 4,159,452 | 6/1979 | Logan et al. | 331/94.5 |
| 4,795,228 | 1/1989 | Schneider | 385/43 X |
| 5,333,218 | 7/1994 | Ortiz, Jr. | 385/43 |

OTHER PUBLICATIONS

Weissman, Z. et al., "Modes Of Periodically Segmented Waveguides," *Journal of Lightwave Technology*, vol. 11, No. 11, Nov. 1993, pp. 1831–1838.

Weissman, Z. et al., "2–D Mode Tapering Via Tapered Channel Waveguide Segmentation," *Electronics Letters*, vol. 28, No. 16, Jul. 30, 1992, pp. 1514–1516.

K. Thyagarajan et al., "Proton–Exchanged Periodically Segmented Wave–Guides In Linbo3," *Optics Letters*, 1994, V19, N12 (Jun. 15), pp. 880–882 (abstract).

*Primary Examiner*—Rodney B. Bovernick
*Assistant Examiner*—Phan T. H. Palmer

[57] ABSTRACT

The present invention relates to a waveguide taper. The waveguide taper has a first end and a second end for being coupled with a fiber. The core has an overall width that progressively increases from the waveguide end toward the fiber end such that the width of the fiber end of the taper corresponds to the diameter of the core of the fiber. Side-gaps are disposed in the sides of the core and extend into the core but not across the entire width of the core. The depth of the side-gaps progressively increases from the waveguide end to the fiber end of the taper. In one embodiment, the side-gaps may be aperiodically and/or randomly disposed along the length of the taper and the side-gaps can be disposed at different angles to a direction of light propagation along a length of the core.

10 Claims, 7 Drawing Sheets

SIDE-GAP MODE TAPERING FOR INTEGRATED OPTIC WAVEGUIDES

RELATED APPLICATION

This application is related to a commonly owned application filed on even date herewith, the full disclosures of which are incorporated herein by reference as if reproduced in full below. This application is titled "Two-Dimensional Segmentation Mode Tapering for Integrated Optic Waveguides," U.S. application Ser. No. 402,266 filed Mar. 10, 1995.

BACKGROUND OF THE INVENTION

1. Field of the Invention

The present invention relates generally to integrated waveguides, and more specifically to a side-gap waveguide taper.

2. Related Art

During the recent decades, the electronics industry has seen massive expansion in the application of integrated circuit technology. As system designers were challenged with more stringent space, power and performance requirements, they turned more and more to solutions implementing integrated circuit technology. Communications systems designers were no exception to this rule. They too, continuously developed an increasing number of components in their systems using integrated circuits.

Contemporaneous with the growth of integrated circuits was the maturation of fiber-optic communications technology and semiconductor laser diode technology. As an almost direct and natural result of the natural compatibility among these technologies, the technology of integrated optics was spawned. Integrated optics, which can be defined as the integration of one or more optical guided-wave structures on a common substrate, are now used to implement numerous useful devices such as power splitters, optical switches, fiber optic transmitters and fiber optic receivers. Integrated optic devices are well suited to applications in such technologies as telecommunications, instrumentation, signal processing and sensors.

In contemporary integrated optic devices, optical channel waveguides are formed on a thin, planar, optically polished substrate. To couple light into and out of the integrated optic device, an optical fiber is butt-coupled to the device. However, differences exist between the optical fibers and the on-chip waveguides, namely, structure and material composition (i.e., differences in core size and refractive index profile). Specifically, because the difference of the refractive index between the core and cladding of a typical waveguide is higher than that of a typical fiber, the optical field is more confined in the waveguide than in the fiber. In addition, the waveguide core dimension is smaller than the fiber core dimension. Therefore, when coupling the waveguide with the fiber, there is a coupling loss. What is needed is a device to match the mode of the waveguide with the mode of the fiber. As a result, mode tapering is used for low-loss coupling of light into waveguides.

One technique used to implement mode tapering has been to change the dimensions of the waveguide. For example, see Koch et al., *IEEE Photonics Technol. Lett.* 2:88–90 (1990); Mahapatra and Connors, *Opt. Lett.* 13:169–171 (1988); and Shani et al., *Appl. Phys. Lett.* 55:2389–2391 (1989). However, because the integrated optic devices are manufactured using photolithographic techniques, tapering by changing both the height and the lateral dimension of the waveguide simultaneously results in a complicated fabrication process.

A second technique, proposed by Z. Weissman and A. Hardy, "2-D Mode Tapering Via Tapered Channel Waveguide Segmentation," *Electronics Letters* 28:1514–1516, (1992), introduces segmented waveguides to implement two-dimensional mode tapering. Modal properties of periodically segmented waveguides are analyzed by Z. Weissman and A. Hardy, "Modes of Periodically Segmented Waveguides," *IEEE Journal of Lightwave Technology* 11:1831–1838 (1993).

According to Weissman and Hardy, segmented waveguides are implemented by introducing a series of gaps into the waveguide such that the waveguide is segmented into a series of segments. Each segment has a gap section of length s, and a core section having a length t. A period $\Lambda$ of the segment is the sum of gap section s and core section length t.

Weissman and Hardy proposed an approach to implementing the segmented waveguide. This approach uses a fixed period segmented waveguide taper. In this approach, the period A of each segment is fixed, and gap length s is successively increased along a length of the taper.

Waveguide segmentation has also been of interest for second harmonic generation in KTP devices (Bierlein et al., *Appl. Phys. Lett.* 56:1725–1727 (1990); Li and Burke, *Opt. Lett.* 17:1195–1197 (1992)). It was found experimentally (Bierlein et al., *Appl. Phys. Lett.* 56:1725–1727 (1990)) that a segmented waveguide section has surprisingly good guiding properties and low radiation loss. Such surprising low-loss results were later theoretically understood based on planar wave model by Li et al. (Li and Burke, *Opt. Lett.* 17:1195–1197 (1992)). Their study concluded that the electromagnetic field can be described by averaging the guiding properties over the segmentation period.

SUMMARY OF THE INVENTION

The present invention is directed toward a tapered waveguide for integrated optics applications. A purpose of the tapered waveguide (the taper) is to match a mode of the fiber to a mode of the waveguide for efficient low-loss coupling. According to the invention, either of two techniques are utilized to implement the tapered waveguide.

A first technique is a segmented taper in which a plurality of segments are provided to expand the mode size along the taper. Each segment is comprised of a gap section and a core section. According to the first technique, the gap length is substantially fixed for each segment. To expand the mode, the core length sections are successively decreased from the waveguide end of the taper toward the fiber end of the taper. This taper is referred to as a fixed-gap taper.

According to the second technique, side-gaps containing gap material are implemented to increase the mode size in the taper. This type of taper is called a side-gap taper. Unlike the fixed-gap taper, the side-gaps do not span the entire distance from one side of the taper core to the other side of the taper core. Instead, the side-gaps extend only partially into the core and define a section of core material therebetween. To expand the mode, a depth of the side-gaps increases progressively from a waveguide end toward a fiber end of the taper. The overall width of the taper may also progressively increase from the waveguide end to the fiber end.

An advantage with the embodiments of the invention is that leakage loss is minimized relative to conventional solutions. In addition, the leakage losses can be reduced because the amount of gap material is kept to a minimum and because total taper length is minimized.

An additional advantage with the side-gap taper is that a more controlled and smoother mode expansion can be obtained. Due to current manufacturing constraints, the minimum feasible gap length obtainable is approximately 1.0–2.0 microns (μm), depending on the fabrication technique. For example, with fixed period segmented waveguides, this results in an unsmooth or step-like increase in mode size in the segments of the waveguide which results in a non-adiabatic transition causing a loss in light energy. However, using side-gaps that only partially span the core eliminates this disadvantage because the increase in mode size is a function of gap material. Since the side-gaps extend only partially into the core, the amount of gap material can be controlled in this additional dimension, namely, depth in addition to length. Thus, the unsmooth or step-like increase in mode size can be eliminated by controlling the depth of the gap (i.e., by controlling the amount of penetration of the gap into the core).

Further features and advantages of the present invention, as well as the structure and operation of various embodiments of the present invention, are described in detail below with reference to the accompanying drawings.

BRIEF DESCRIPTION OF THE DRAWINGS

The present invention is described with reference to the accompanying drawings. In the drawings, like reference numbers indicate identical or functionally similar elements. Additionally, the left-most digit(s) of a reference number identifies the drawing in which the reference number first appears. It should be noted that in drawings where dimensions or dimensional characteristics are illustrated, the illustrations are not necessarily drawn to scale.

DETAILED DESCRIPTION OF THE EMBODIMENTS

1. Introduction and Overview of the Invention

The present invention is directed toward a novel approach to implementing a two-dimensional tapered waveguide into integrated-optic devices. Two techniques of the invention are described herein, each having multiple embodiments. The first technique uses a segmented waveguide, similar to that described above, but with at least one key distinction: the first technique of the present invention implements a fixed-gap, varying-period segmented waveguide.

According to the second technique the waveguide is not actually segmented in the strict sense of the term. According to the second technique, gaps are introduced, however, the gaps do not span the entire width of the waveguide. Instead, the gaps, called side-gaps, are cut into the sides of the core of the waveguide and define core sections therebetween. The side-gaps are filled with cladding material. A depth of each side-gap increases along the length of the taper. At a first end of the taper, which is adjacent the waveguide, the depth of the notches are relatively small. Whereas the depth of side-gaps on the fiber end of the core are larger. The depth of the side-gaps increase (i.e., gradually or in step-like manner) along the taper from the waveguide end to the fiber end as a function of their position along the taper.

Each of these two approaches is discussed in detail below. Section 2 of this document discusses the fixed gap segmentation approach, and compares it's results to other segmentation approaches. Section 3 discusses the side-gap taper approach.

In this document, the term "length" is used to refer to a dimension in the propagation direction and along a longitudinal axis of waveguide 104; and "width" refers to a dimension orthogonal to the propagation direction and in parallel to the semiconductor and glass layers.

In addition, this document refers to a tapered waveguide. It is within the scope of the invention to have the taper integrated with or coupled to the waveguide.

2. Fixed Gap Segmentation Tapering

Figure 1:
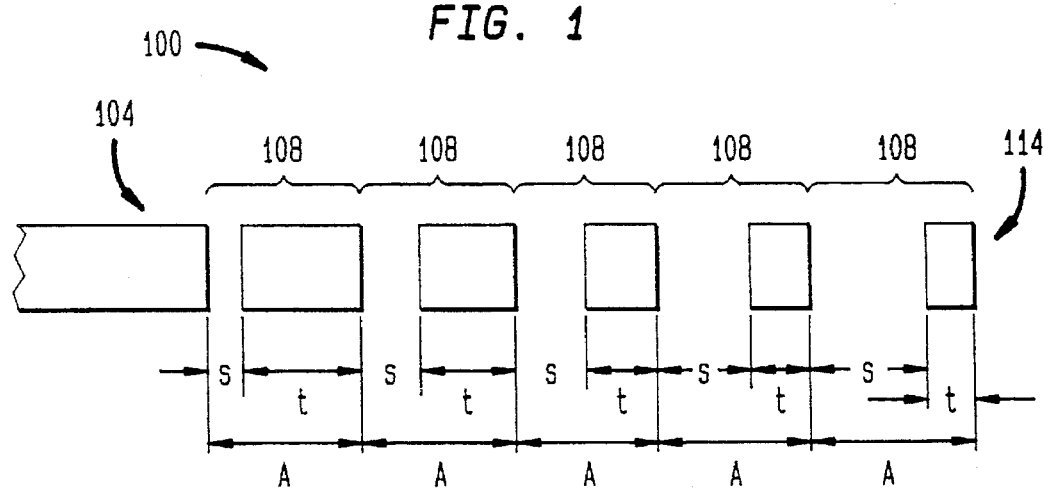
FIG. 1 is a diagram illustrating a fixed-period segmented waveguide taper.

FIG. 1 is a diagram illustrating a fixed period segmented taper 100. The fixed period segmented taper comprises a waveguide 104 and a plurality of segments 108. An optical fiber (not shown) is coupled to the waveguide 104 at a fiber junction 114. Each segment 108 comprises a gap portion and a core portion of waveguide material. A period Λ of each segment 108 is the gap length s plus a length of the core portion t for that segment 108 (Λ=s+t).

With the fixed period segmented taper 100, the period Λ remains constant or fixed along the propagation direction for the entire length of the taper 100. However, to adjust the effective, or average, refractive index difference between the core and the cladding along the propagation direction, the gap length s of each segment 108 is varied. That is as light travels along the waveguide toward the fiber it encounters increased lengths of gap material. As a result, the effective index difference between the core and the cladding is decreased, causing the mode to expand. Conversely, as light travels from the fiber toward the waveguide it encounters decreasing lengths of gap material(s). As a result, the effective index difference is increased causing the mode to be more confined.

The inventors have implemented segmented tapers as discussed by Weissman and Hardy. However, Weissman and Hardy discuss applications of such tapers in Rb:KTiOPO$_4$ waveguides. When implementing segmented tapers using, for example, Silica-on-Silicon technology, the inventors have discovered that fixed period (fixed Λ) segmented tapers (i.e., tapers where the gap length s increases with each subsequent gap along the propagation direction) as taught by Weissman and Hardy, result in leakage loss into the substrate. This is primarily due to the properties of the materials used when implementing waveguides using certain materials, such as Silica-on-Silicon technology.

Waveguides in Silica-on-Silicon technology often use $SiO_2$ as the cladding material and doped $SiO_2$ for the core material. As the name implies, the waveguide is fabricated on a Silicon substrate. The gap material used is also $SiO_2$. However, $SiO_2$ has a refractive index of approximately 1.45, and the Silicon substrate has a refractive index of 3.5. Due to the relative indexes of these materials, total internal reflection is not achieved. As the gap length s increases resulting in an expanded mode size, part of the mode field tail is lost to the substrate. This results in an increased loss.

To overcome the problem of substrate leakage when implementing waveguide tapers using materials prone to leakage, the inventors have developed an improved segmented taper. This improved taper is a fixed gap-length tapered waveguide. Using a fixed gap length allows the amount of light lost to the substrate to be decreased.

Figure 2:
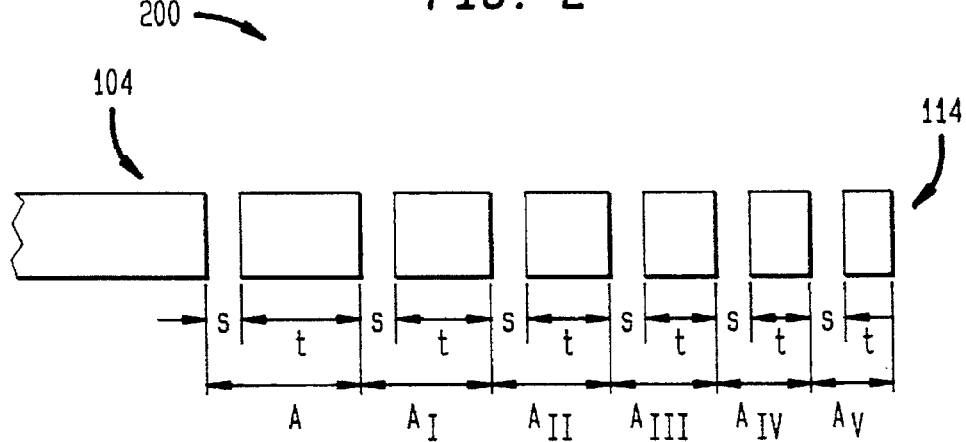
FIG. 2 is a diagram illustrating an example implementation of a fixed-gap segmented waveguide taper.

FIG. 2 is a diagram illustrating a fixed gap length (s) segmented taper 200 of the present invention. According to the fixed gap taper 200, the gap length s of each successive segment is substantially the same. To decrease the effective index difference between the core and the cladding along the taper, the length t of the core portion of each consecutive segment is decreased progressively, thus correspondingly decreasing the period as shown by $\Lambda$, $\Lambda_I$, $\Lambda_{II}$, $\Lambda_{III}$, $\Lambda_{IV}$, and $\Lambda_V$. As a result of the gap length s remaining constant, the leakage loss is minimized from each segment, as will be discussed below.

2.1 Insertion and Leakage Loss of Segmented Tapers

This section describes and compares the leakage losses and insertion losses of fixed gap tapers 200 and fixed period tapers 100. Insertion loss is defined as the total signal loss as the light travels from an input fiber to an output fiber and includes leakage loss. Insertion loss is also introduced at the fiber/waveguide junctions 114 due to mode mismatch. Leakage loss, described above, is the loss of light, due primarily to scattering, from the waveguide to the substrate.

Figure 3:
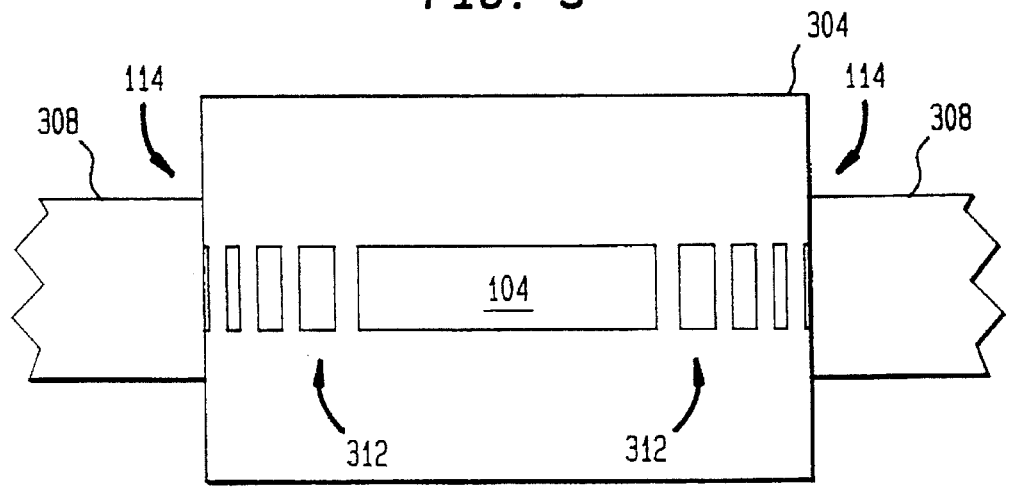
FIG. 3 is a diagram illustrating an integrated waveguide having a taper at each end and a fiber coupled to each taper.

FIG. 3 is a diagram illustrating sources of insertion loss and leakage loss in a waveguide/fiber package. According to FIG. 3, waveguide 104 is fabricated in a layer 304, such as glass, or silica, and optical fibers 308 are coupled to either end of waveguide 104 at fiber/waveguide junction 114. In a preferred embodiment, the fiber ends are cleaved, polished and butt-coupled to waveguide 104. A taper shown generally at 312 (which may include fixed period taper 100, fixed gap taper 200 or side-gap taper 802) is used on either end of waveguide 104 to match the mode of waveguide 104 to the mode of the fiber 308. In such a package, leakage loss is introduced by light scattering from the core of the taper 312 into the substrate.

2.2 Comparison of Insertion Loss and Leakage Loss Characteristics

Figure 4:
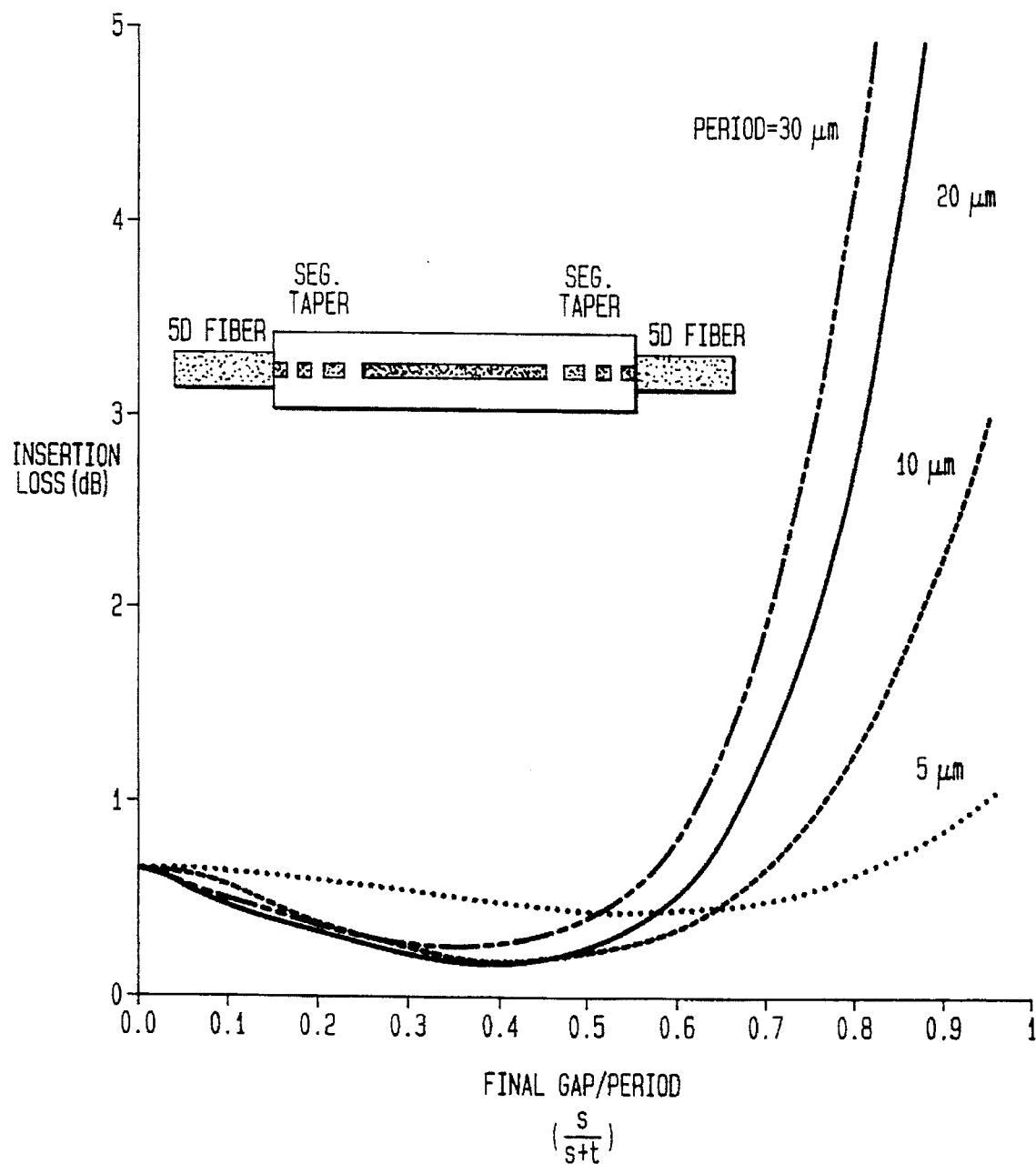
FIG. 4 is a diagram illustrating insertion loss as a function of the final gap/period ratio for a fixed-period taper.
Figure 5:
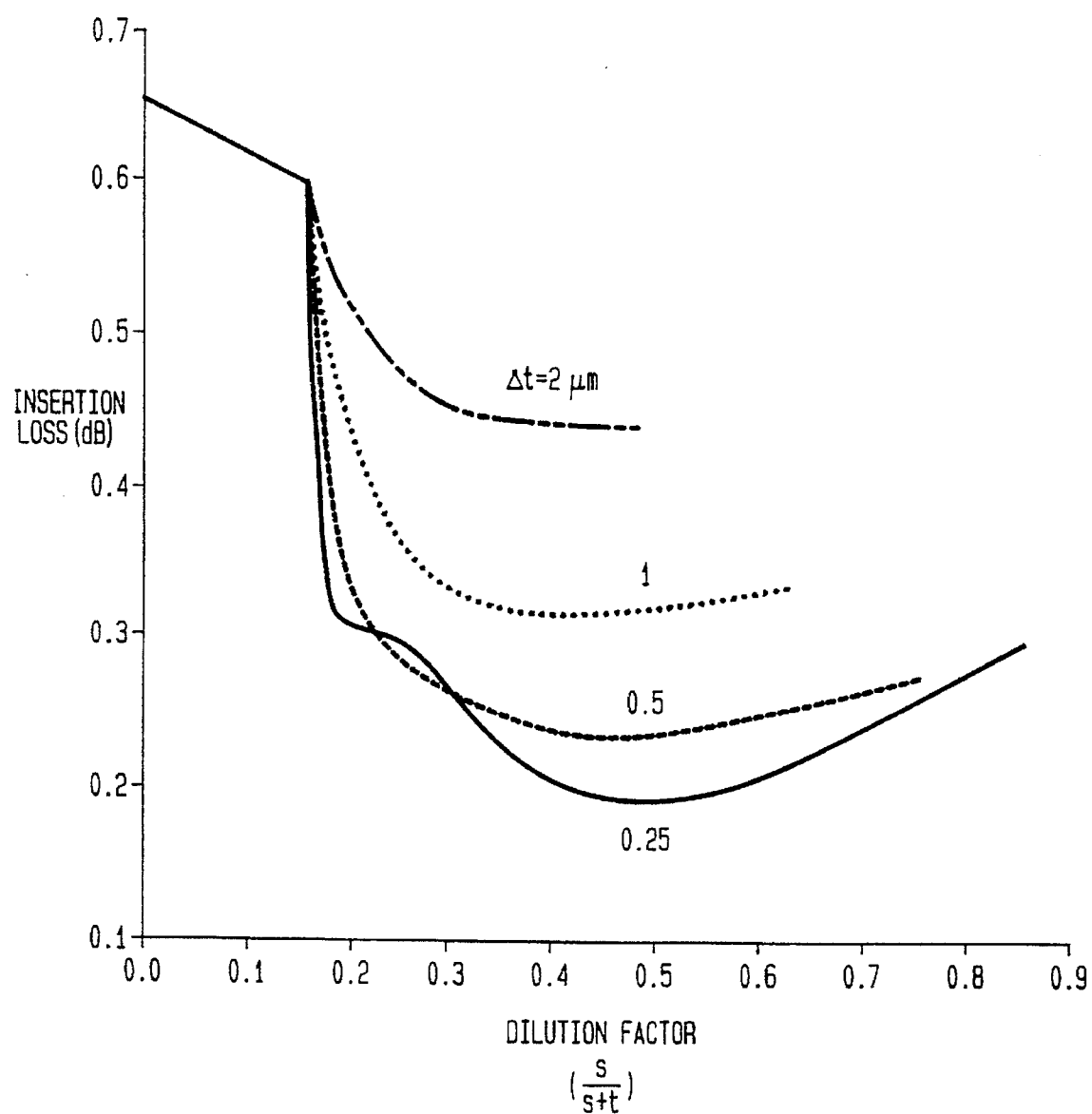
FIG. 5 is a diagram illustrating insertion loss as a function of the dilution factor for a fixed-gap taper.

For purposes of the following discussion, it is noted that the results illustrated in FIGS. 4 and 5 assume no leakage loss. Further note that waveguide material losses are assumed to be negligible.

FIG. 4 is a diagram illustrating the insertion loss (ordinate) characteristics of a fixed period taper 100 as a function of the final ratio of the gap to the period s/(s+t) (abscissa). The results illustrated in FIG. 4 are theoretical and are from a study performed by the inventors using light having a wavelength $\lambda$ of 1.32 µm (microns) and standard 5-D fiber (d~8 µm, $\Delta n$ of 0.39%). The core is a 5×5 µm core with an index ratio $\Delta n$ of 0.62%. An initial gap used is 0.5 µm. The initial gap is the first gap on the waveguide end of the taper. The gap increment, which is the length by which each consecutive gap is increased along the length of the taper (from waveguide end toward fiber end), is 0.25 µm.

For a 20 µm fixed period taper 100 which provides lowest insertion loss at the optimum s/(s+t) ratio, the minimum insertion loss is approximately 0.2 dB. This minimum occurs where the final s/(s+t) is approximately 0.4. For the 20 µm fixed period taper 100, this translates to an optimum final gap length s=8 µm.

FIG. 5 is a graph illustrating the insertion loss of a fixed gap taper 200 according to one embodiment of the invention, namely, the fixed gap taper. As stated above, in a fixed gap taper 200, the gap length s is maintained constant among successive gaps in the fixed gap taper 200. FIG. 5 illustrates the insertion loss (ordinate) as a function of a characteristic called the dilution factor (abscissa). The dilution factor is a measure of the ratio of the gap length (s) over period (s+t) for each segment. Because gap length s remains constant and the period (s+t) decreases along the length of the taper in the direction of the fiber 308, the dilution factor increases with the length of the taper.

The theoretical results in FIG. 5 were obtained assuming light having a wavelength $\lambda$ of 1.32 µm and standard 5-D fiber. The core is a 5×5 µm core with an index ratio $\Delta n$ of 0.62%. The gap, however, is a fixed gap length s=2 µm and the length of the initial core portion (the first core portion at the waveguide end of the taper) is $t_0$=10 µm. The 2 µm gap length is chosen because it is readily achievable using current fabrication processes, although alternative gap lengths can be chosen. Each curve in FIG. 5 illustrates a different variation in core portion length t from one segment to the next. For example $\Delta t$=2 µm indicates that each successive core portion is decreased in length by 2 µm. Similarly, for an embodiment of the fixed gap taper 200 where $\Delta t$=0.25 µm, each successive core portion is decreased in length by 0.25 µm. The curve that has $\Delta t$=0.25 µm is the optimum curve.

As illustrated in FIG. 5, for the embodiment where $\Delta t$=0.25 µm, the minimum insertion loss occurs where the dilution factor is approximately 0.5. In this embodiment with a dilution factor of 0.5 and fixed gap length s=2 µm, the core portion is equal to 2 µm. Note that the minimum insertion loss is approximately 0.2 dB for the embodiment where $\Delta t$=0.25 µm. This is the same minimum insertion loss obtainable when using a fixed period (20 µm) taper 100, as illustrated in FIG. 4.

As stated above, the leakage loss characteristics for a fixed period taper 100 are generally undesirable due to the increasing gap length introduced in the direction from waveguide 104 to fiber 308. Another factor affecting leakage loss is the length of the taper. This factor can be an area of concern for both the fixed-period taper 100 and the fixed-gap taper 200. The reason taper length is a factor with leakage loss is simple: Due to the increased mode size, the extended mode field tail extends into the substrate and energy is lost. As a result, leakage loss can be a more serious concern in the fixed period taper 100 where total taper length is increased. The leakage loss characteristics of fixed period tapers 100 and fixed gap tapers 200 are now described and compared.

Figure 6A:
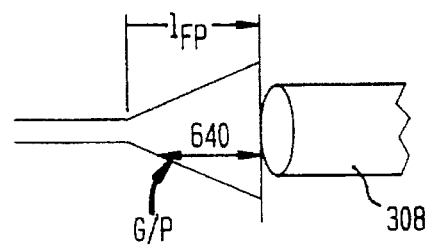
FIGS. 6A and 6B are diagrams illustrating taper length for a fixed-period taper and a fixed-gap taper, respectively.
Figure 6B:
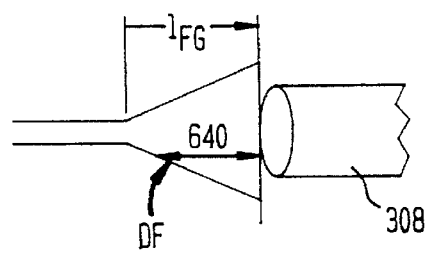
Figure 7:
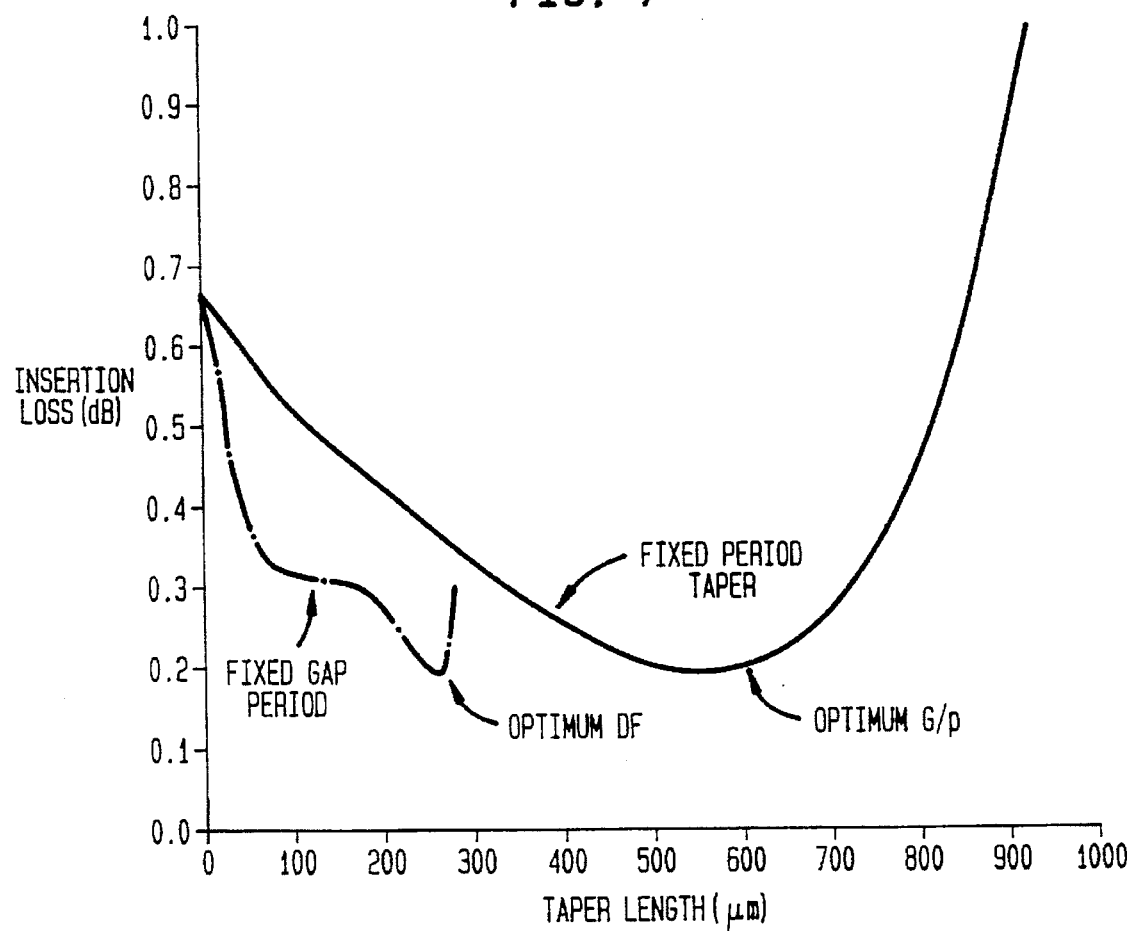
FIG. 7 is a diagram illustrating insertion loss as a function of taper length for a fixed-period taper and a fixed-gap taper.

FIGS. 6A and 6B illustrate the concept of mode size expansion for fixed period taper 100 (FIG. 6A) and the fixed gap taper 200 (FIG. 6B). The total taper length for the fixed period taper is $l_{FP}$ and for the fixed gap taper is $l_{FG}$. The optimum total taper length of each taper is where the minimum insertion loss occurs, in particular, at the final gap/period ratio shown by the arrow labeled "optimum G/P"

in FIG. 7; and the dilution factor shown by the arrow labeled "optimum DF" in FIG. 7. The additional length 640 of the taper beyond the optimum total taper length is due to manufacturing error. Thus, as illustrated in FIG. 4, for the embodiment of fixed period taper 100 where the period=20 µm, the optimum total taper length is where s/(s+t)= approximately 0.4. Similarly, as illustrated in FIG. 5, for the embodiment of fixed gap taper 200 where Δt=0.25, the optimum total taper length is obtained where the dilution factor is approximately 0.5. The optimum total taper length associated with the minimum insertion loss can be determined from FIG. 7 and is discussed below.

A comparison of the optimum total tape lengths ($l_{FP}$ and $l_{FG}$) for the fixed period taper 100 and the fixed gap taper 200 is made at comparable insertion loss points. In the embodiment of fixed period taper 100 where the period=20 µm, the optimum total taper length is where the s/(s+t) is equal to approximately 0.4, and where the insertion loss is at a minimum of approximately 0.2 dB. As is illustrated in FIG. 7, which shows the taper length versus insertion loss for a fixed period taper, this corresponds to a taper length $l_{FP}$ of approximately 575 µm.

In contrast, for the fixed gap taper 200 in the embodiment where the starting segment length is 10 µm, with Δt=0.25 µm and fixed gap length s=2 µm, the minimum insertion loss of 0.2 dB is obtained with a taper length $l_{FG}$ of approximately 260 µm. This is also illustrated in FIG. 7.

Thus, for similar insertion loss characteristics, the optimum total taper length l is significantly shorter for the fixed gap taper 200 than can be obtained for the fixed-period taper 100 (e.g., $l_{FG} < \frac{1}{2} l_{FP}$, as illustrated in FIG. 7). As a result, for similar insertion loss characteristics (as illustrated in FIGS. 4 and 5), the leakage loss is less for the fixed gap taper 200 of the present invention.

3. Side-Gap Tapers

Figure 8:
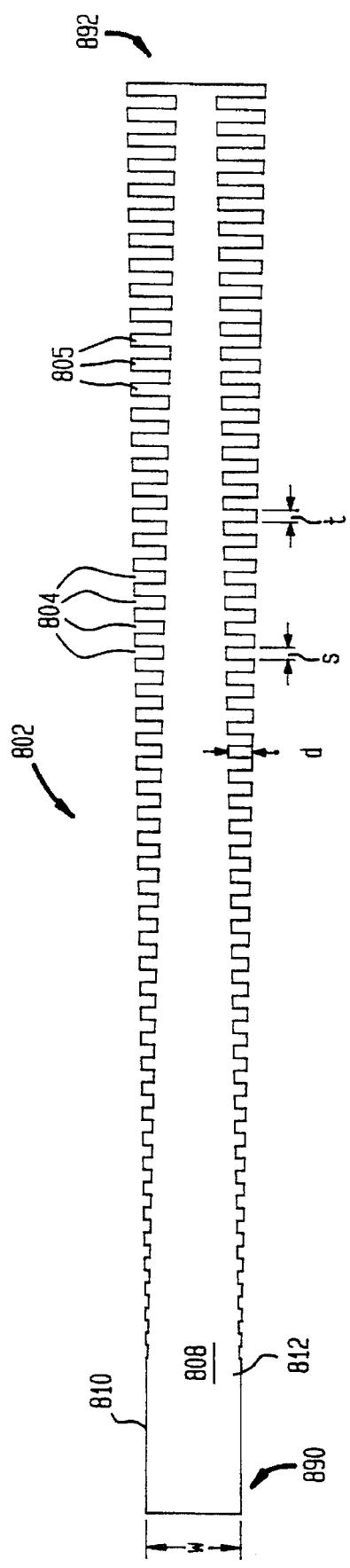
FIG. 8 is a diagram illustrating an example implementation of a side-gap taper.

As stated above, a second embodiment of the waveguide taper has a first end (shown generally at 890 in FIG. 8) for being integrated with or coupled to a waveguide and second end (shown generally at 892 in FIG. 8) for being coupled to a fiber. However, in this embodiment of the present invention as shown in FIG. 8, the gaps do not traverse an entire width w of a core 808. In other words, the gaps do not extend from one outermost side 810 of the core 808 to another outermost side 812 of the core 808. Instead, in this embodiment of the invention side-gaps 804 are cut in the outermost sides (810 and 812) of the core 808 and are filled with cladding material. In this embodiment, a depth d of the side-gaps 804 may vary from the first end 890 to the second end 892.

Specifically, side-gaps 804 are formed in the outermost sides 810 and 812 for substantially the entire length of the taper 802 from the first end 890 to the second end 892 and extend into core 808 in a direction perpendicular to the direction of light propagation. The side-gaps 804 define core segments 805 therebetween. At the second end 892 of the side-gap taper 802, the side-gaps 804 extend deeper into the side-gap taper 802 than at the first end 890. In particular, the depth d of the side-gaps 804 increases progressively from the first end 890 of the side-gap taper 802 toward the second end 892. Additionally, the outermost sides 810 and 812 of the core 808 are sloped such that the entire width of the core 808 increases toward the second end 892.

This approach offers a low-loss, adiabatic expanding of the guided optical mode. In addition, an overall width (between the outermost sides 810 and 812) of the core 808 of the taper 802 may vary from the first end 890 (where mode confinement is at a maximum) to the second end 892 of the taper 802 to further facilitate matching the optical mode of the waveguide with the optical mode of the fiber. By also varying the overall width, the width of the second end 892 of the taper 802 may be tailored to correspond to the diameter of the particular fiber to which it will be coupled (at least in one dimension). In particular, with this embodiment, not only the delta (Δ) between the waveguide and fiber is matched, but also the geometry of the waveguide and fiber are matched. (The delta of a waveguide or fiber is defined as the fractional differences of the refractive index between the core and the cladding.) As a result, the connection therebetween is improved and losses are reduced. Furthermore, in this embodiment, the side-gaps 804 may be angled or tilted to reduce back-reflection as will be discussed below with reference to FIG. 9.

With the side-gap taper 802, therefore, the dilution factor is now:

$$DF = f \cdot \frac{w - 2d}{w} \cdot \frac{t}{s+t}$$

where w is the width of the taper 802, d is the depth of the side-gaps, s is the length (in the light propagation direction) of the side-gaps 804, t is the length of the core section, and f is a weighting factor determined by the magnitude of the optical field in the side-gap 804 relative to that at the center of the taper 802. The depth d of the side-gaps 804 thus becomes an additional degree of freedom in controlling the dilution factor DF. By increasing depth d gradually along the taper 802 in the light propagating direction (or from first end 890 toward second end 892), a gradual change of the dilution factor DF is obtained without requiring a small side-gap length s. Again, this approach offers a low-loss adiabatic expansion of the guided optical mode.

However, an exact match between the optical mode of the waveguide and that of the fiber occurs only when both the delta and the core size (more precisely, the refractive index profile) of the waveguide and the fiber are matched. Therefore, with the taper 802, in one embodiment, the overall width of the side-gap taper 802 is also gradually expanded to a size at the second end 892 that is comparable to or larger than the core diameter of the fiber. By gradually expanding the size of core 808 of the taper 802, the coupling loss is further reduced because of the improved match of the optical mode between the taper 802 and the fiber. By expanding the core size of the taper 802 along its length, the optical field has a smaller tail extending into the substrate and the substrate leakage loss is also reduced. Finally, the coupling efficiency of the taper 802 is also more tolerant of fabrication errors in the size of the side-gap because with the expanded width of the core 808 of taper 802, it depends less on the dilution ratio.

For purposes of illustration only, the following example of dimensions is provided. For example, one embodiment of the taper 802 may have a width at the first end 890 of 5 µm and is expanded gradually to 8 µm at the second end 892. The length of the taper 802 is approximately 800 µm. The side-gap length s is approximately 4 µm. The side-gap depth d starts at 0 µm at the first end 890 and increases gradually to 3 µm at the second end 892. The period of the segmentation is approximately 12 µm.

The interface between the core portions 805 and side-gaps 804 in taper 802 causes the guided lightwave to reflect. The magnitude of the reflection at each interface is approximately $(\Delta/n)^2 \sim 10^{-5}$, which for silica (n=1.45) is too small to be a sizable contribution to the insertion loss of the taper.

However, even this negligible amount of reflection may be strong enough to be intolerable by applications requiring low return loss (i.e., backward reflection). Accordingly, the embodiment of the present invention as shown in FIG. 9 is used.

Figure 9:
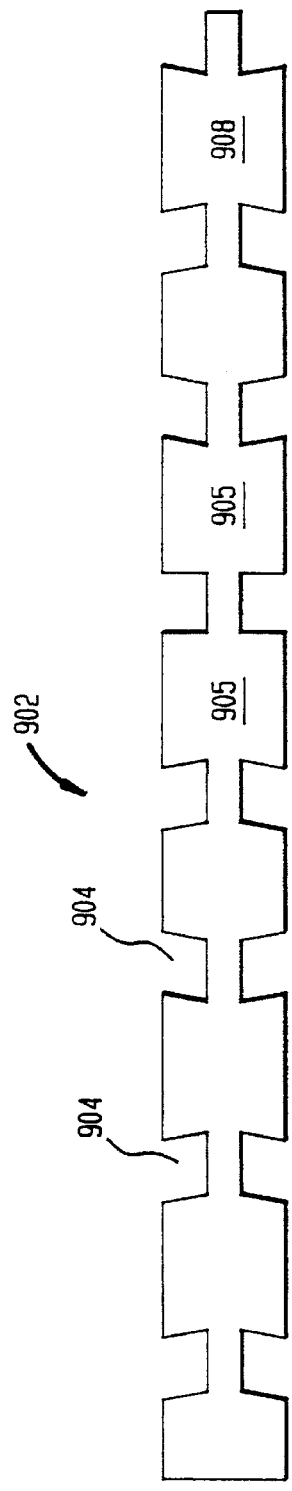
FIG. 9 is an expanded view diagram illustrating an alternate embodiment of the side-gap taper shown in FIG. 8.

In particular, as shown in FIG. 9, a taper 902 is shown having side-gaps 904 and core 908 with core portions 905. Specifically, an interface between the side-gaps 904 and core portions 905 is tilted (randomly here) and aperiodic in position is order to reduce back reflection. Side-gaps 904 are configured so that the interface between the side-gaps 904 and the core portions 905 are at an angle of typically 75° (instead of 90° as shown in FIG. 8) relative to the light propagating direction. The interface between the side-gaps 904 and core portions 905 are placed at non-periodic positions along the side-gap taper 902 to avoid coherent reflections. Unlike in FIG. 8, the aspect ratio in FIG. 9 is 1:1. Although not shown in this portion of taper 902, the depth d of side gaps 904 may vary in accordance with the invention.

Figure 10:
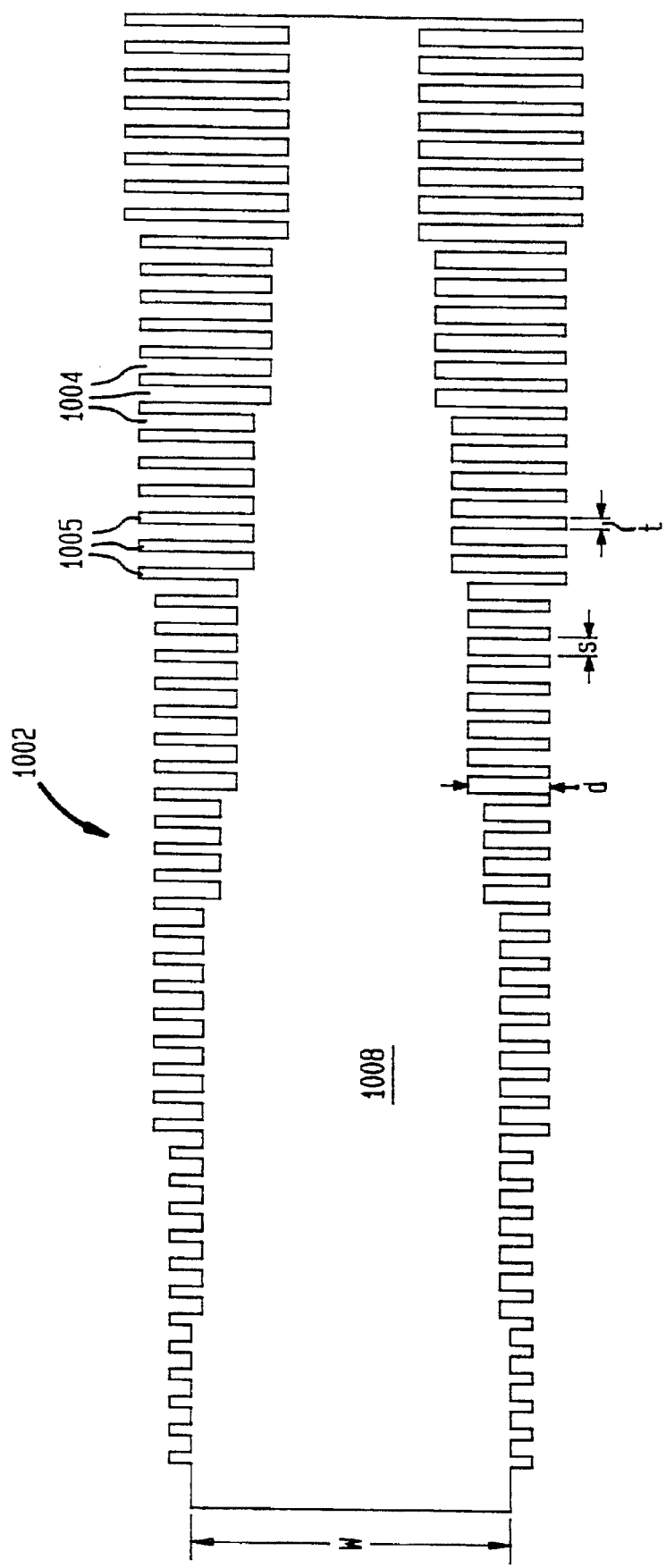
FIG. 10 is a diagram illustrating another embodiment of the side-gap taper of the present invention.
Figure 11:
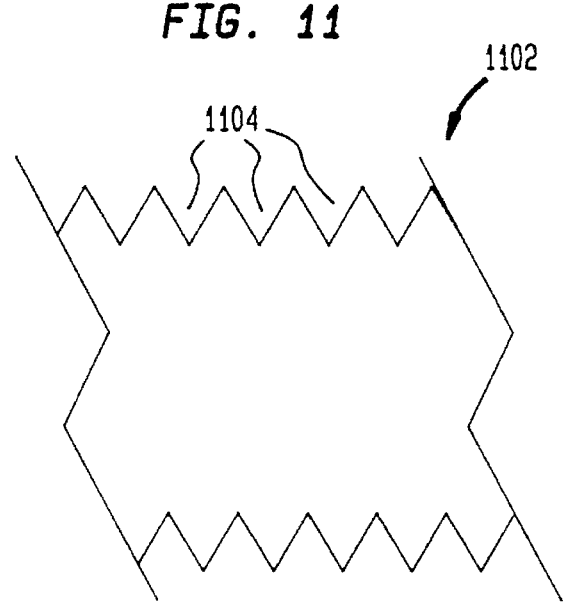
FIG. 11 is a diagram illustrating another embodiment of the side-gap taper of the present invention.
Figure 12:
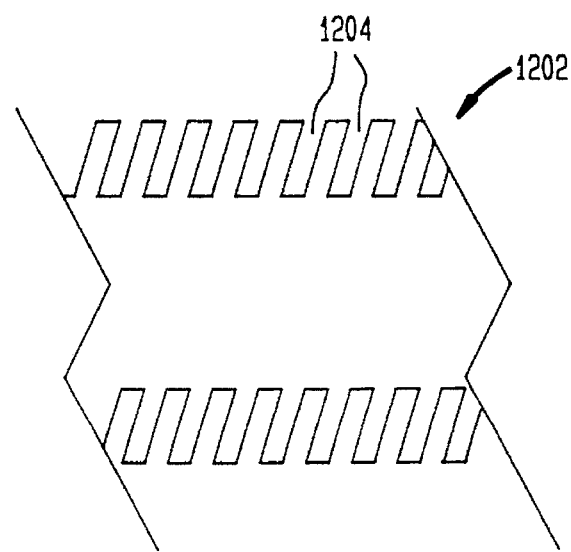
FIG. 12 is a diagram illustrating yet another embodiment of the side-gap taper of the present invention.
Figure 13:
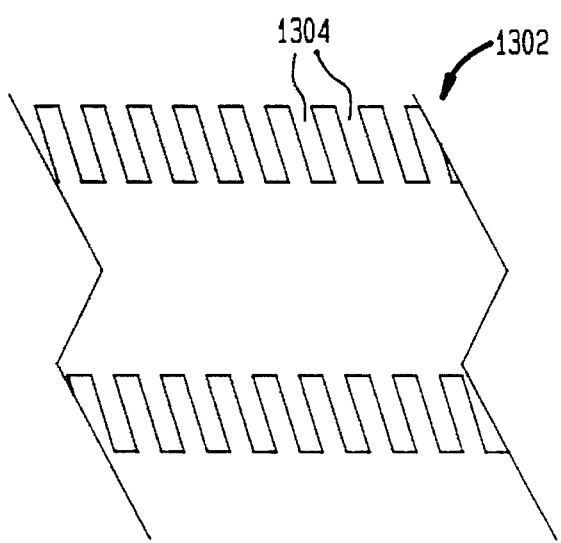
FIG. 13 is a diagram illustrating yet another embodiment of the side-gap taper of the present invention.

FIGS. 10, 11, 12, and 13 show examples of alternate embodiments of the tapers 802 and 902 of the present invention. In particular, FIG. 10 shows a step-like increase in the width w of the core 1008 of taper 1002 having side gaps 1004 and core portions 1005. FIG. 11 shows an alternate embodiment of side-gaps 1104 in a portion of taper 1102 having a triangular configuration. FIG. 12 shows an alternate embodiment of side-gaps 1204 in a portion of taper 1202. FIG. 13 shows an embodiment of side-gaps 1304 in a portion of taper 1302. However, these embodiments are provided for purposes of illustration only and it is within the scope of the invention to vary the placement, angle, size and orientation of the side-gaps both systematically and randomly for the taper.

As would be apparent to a person skilled in the relevant art, other embodiments are equally realizable. For example, without limitation, consider an embodiment where each subsequent side gap extends slightly farther into the core than did the previous gap. This embodiment could be extended to include an embodiment where each subsequent gap extends slightly farther into the substrate and/or as slightly farther into the core.

The preferred embodiment was chosen and described in order to best explain the principles of the present invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A waveguide taper, comprising:

a core having a first end, a second end for being coupled to a fiber, a first side and a second side; and side-gaps disposed along at least one of said first and second sides of said core from said first end to said second end, wherein each of said side-gaps has a depth, said depth of each said side-gap progressively increases from said first end to said second end, and the side-gaps extend only partially into the core.

2. A waveguide taper according to claim 1, wherein said first side and said second side define a maximum width of said core from said first end to said second end, and said maximum width increases from said first end toward said second end.

3. A waveguide taper according to claim 2, wherein said maximum width of said core defines steps along said first and second sides, wherein said steps ascend progressively from said first end to said second end.

4. A waveguide taper according to claim 1, further comprising a direction of light propagation along a length of said core, wherein said side-gaps are disposed substantially non-perpendicular to said direction of light propagation.

5. A waveguide taper according to claim 4, wherein said side-gaps are randomly disposed along said direction of light propagation.

6. A waveguide taper according to claim 2, wherein said maximum width at said first end of said core corresponds to a width of the waveguide, and said maximum width at said second end of said core corresponds to a width of the fiber.

7. A waveguide taper according to claim 1, further comprising a direction of light propagation along a length of said core, wherein said side-gaps are disposed substantially perpendicular to said direction of light propagation.

8. A waveguide taper according to claim 1, further comprising a direction of light propagation along a length of said core, wherein said side-gaps comprise at least a first and second side-gap and said first side-gap is disposed at a first angle to said direction of light propagation and said second side-gap is disposed at a second angle to said direction of light propagation different from said first angle.

9. A waveguide taper according to claim 1, wherein said first end is integrated with a waveguide.

10. A waveguide taper according to claim 1, wherein said first end is coupled with a waveguide.

* * * * *